United States Patent [19]
Rettig

[11] 3,733,543
[45] May 15, 1973

[54] ADJUSTABLE FREQUENCY CURRENT SOURCE POWER SUPPLY OF THE INVERTER TYPE

[75] Inventor: Charles E. Rettig, Brookfield, Wis.

[73] Assignee: The Louis Allis Company, Milwaukee, Wis.

[22] Filed: Aug. 17, 1972

[21] Appl. No.: 281,601

[52] U.S. Cl. .................. 321/2, 321/5, 321/45 C, 321/61
[51] Int. Cl. .............................................. H02m 5/44
[58] Field of Search .............. 318/227; 321/2, 5, 321/18, 45, 45 C

[56] References Cited

UNITED STATES PATENTS

| | | | |
|---|---|---|---|
| 3,300,705 | 1/1967 | Hunstad | 321/2 |
| 3,368,164 | 2/1968 | Shapiro | 321/45 R X |
| 3,555,396 | 1/1971 | Kalman | 321/2 |
| 3,665,286 | 5/1972 | Ohno | 321/2 |

*Primary Examiner*—William M. Shoop, Jr.
*Attorney*—Alan C. Rose et al.

[57] ABSTRACT

A power supply of the inverter type for controlling the operative condition of an alternating current load includes a power source providing an output current of a desired magnitude. An inductor is connected in the output of the power source to assist in maintaining the output current at the desired magnitude. An inverter is connected in series with the power source and inductor and is coupled to the alternating current load for cyclically directing the output current of the power source to the load for controlling the operative condition thereof.

7 Claims, 2 Drawing Figures

3,733,543

ADJUSTABLE FREQUENCY CURRENT SOURCE POWER SUPPLY OF THE INVERTER TYPE

CROSS-REFERENCE TO RELATED APPLICATION

This application is related to and incorporates by reference the subject matter of a commonly owned application entitled "Adjustable Frequency Current Source Power Supply of the Inverter Type," filed Oct. 26, 1970, Ser. No. 83,922, by the same inventor Charles E. Rettig.

BACKGROUND OF THE INVENTION — FIELD OF THE INVENTION

The present invention relates to adjustable frequency power supplies for alternating current loads, and more particularly to an inverter power supply of the current source type.

BACKGROUND OF THE INVENTION — DESCRIPTION OF THE PRIOR ART

With the advent of reliable, high power rating, low cost semiconductor components, such as silicon controlled rectifiers, commonly, and herein, termed thyristors, adjustable frequency control equipment has become more practical from a technical and economic standpoint. A highly useful, but by no means exclusive, application of such adjustable frequency equipment is in the control of alternating current motors. Other applications may typically include power supplies for lighting and induction heating apparatus.

In the case of alternating current motors, the speed of the motor depends on the frequency of the alternating current applied to the motor, and in the usual case, the most readily available power source is of constant frequency, for example, 60 cycles per second, or Hertz, power mains. Operation of alternating current motors from such power supplies, severly limits their application since the output characteristic exhibited is that of constant speed operation. Thus, to provide variable speed operation to an alternating current motor, it is necessary to energize the motor from a variable frequency power supply. A variable frequency power supply of the inverter type includes a direct current link by which the constant frequency of the power mains is converted into direct current and the direct current subsequently changed back into alternating current of the desired variable frequency.

To improve the operation of variable frequency inverter power supplies, a current source has been incorporated in the power supply instead of a voltage source, as disclosed in the referenced patent application.

In addition to being of constant frequency, industrial power mains are usually of a constant voltage, for example, 240 volts. Thus, most of the adjustable frequency inverter power supplies heretofore developed have been voltage operated and controlled devices. Such power supplies may be characterized as "voltage source inverters."

The design of a current source inverter to supply adjustable frequency current to a particular load includes the selection of the size, in microfarads, of the commutating capacitors. The capacitor size must be made large enough so that the peak voltage resulting from the commutation of current between two phases of the load are less than the voltage ratings of the thyristors and diodes in the circuit. Since this peak voltage is related to the magnitude of current being commutated, the capacitor size must be selected for the highest value of current.

In designing a current source inverter for certain loads, particularly motors which are operated in the constant horsepower mode, the large capacitor selected according to the above criteria causes a problem in light load operation at high frequency. At light load the current magnitude is too small to swing the voltage on the capacitors, and hence commutate the motor current, during the time the interval between firing of successive thyristors. In this case the inverter degenerates into an undesired mode of operation and fails to deliver the desired current to the load.

My invention provides paths for current flow which will swing the capacitor voltage in the desired time and in response to the firing of the inverter thyristor but without this current being present in either the load or the direct current source.

SUMMARY OF THE INVENTION

The present invention overcomes the above and other disadvantages of the invention by providing an inverter interposable between a source of electrical energy, and an alternating current load, such as a motor, for controlling the operative condition of the latter. The electrical energy source provides an output current of a desired magnitude to the input of the inverter.

The inverter is connected in series with the source of electrical energy and has its output terminals coupled to the load. The inverter is of the diode isolated, capacitor commutating type and cyclically directs the output current of the electrical energy source to the load for controlling the operative condition thereof. The inverter has at least a pair of parallel current paths containing an electronic switch means such as a thyristor and a diode in series between the input and output of the inverter. A commutating capacitor is connected between each pair of parallel current paths. Each commutating capacitor is resonantly discharged by a reactor to minimize the time required to direct the output current from one current path to another.

It is therefore an object of the invention to provide an inverter which transfers current between at least a pair of current paths in a minimum amount of time.

It is another object of the invention to provide an inverter which utilizes a capacitor for transferring current between at least a pair of parallel current paths and a reactor which resonantly discharges the capacitor to minimize the transfer time.

DESCRIPTION OF THE PREFERRED EMBODIMENT

Figure 1:
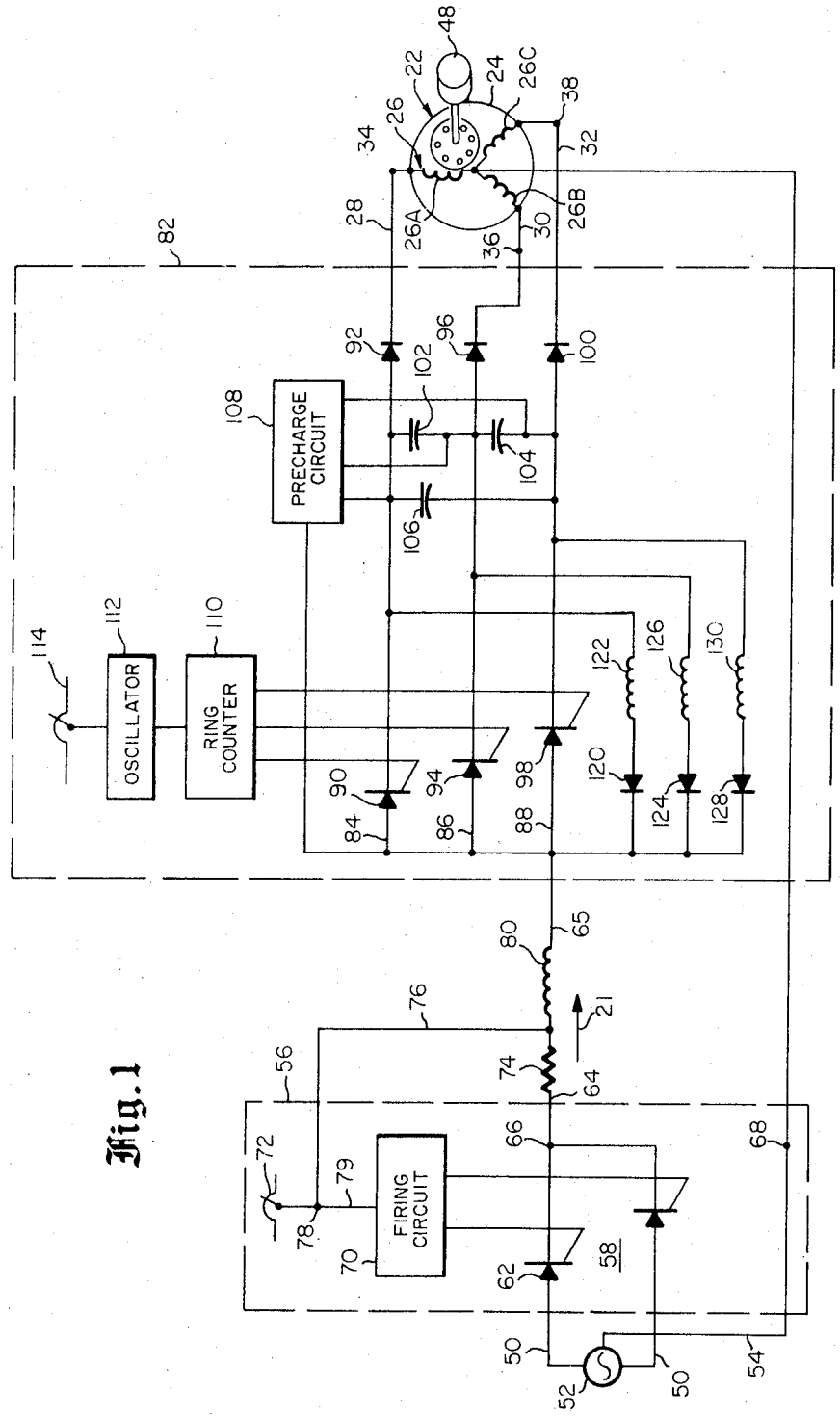
FIG. 1 is a schematic diagram of the adjustable converter of the present invention.
Figure 2:
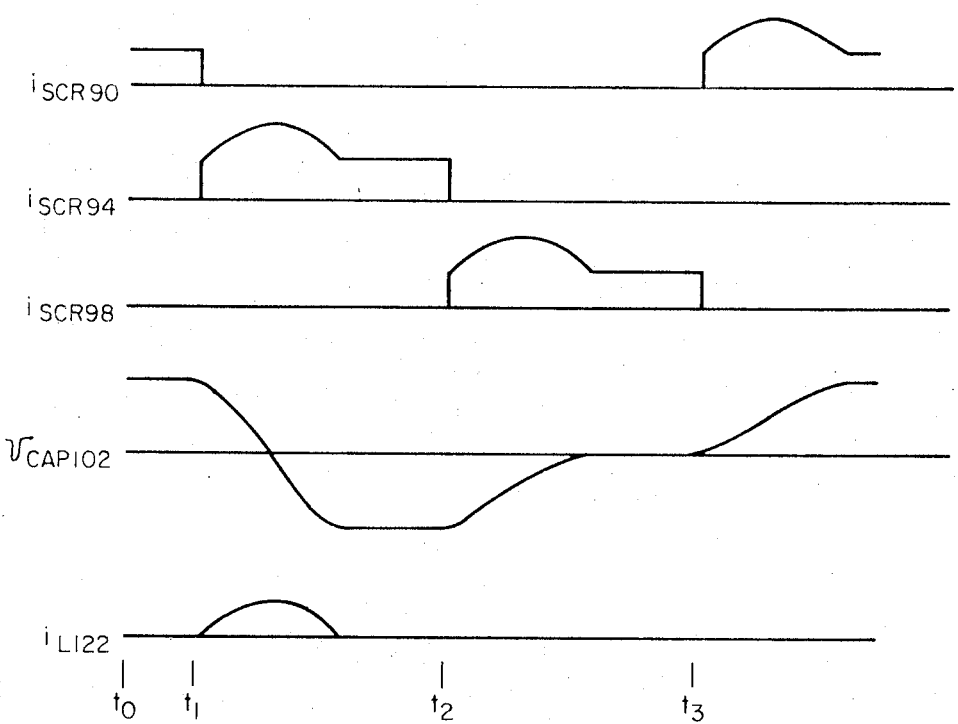
FIG. 2 is a current and voltage wave form graph showing the operation of the inverter of FIG 1.

In FIG. 1, there is shown an adjustable frequency current source power supply 20 for controlling the operative condition of an alternating current device, shown for illustrative purposes as induction motor 22. Alternating current induction motor 22 includes a stator 24 of conventional laminated iron core construction having polyphase stator winding 26 disposed therein for generating a revolving magnetic field when energized. Stator winding 26 includes stator coils 26A, 26B and 26C connected to form a conventional star connected stator winding. Stator coils 26A, 26B and 26C are energized by supply lines 28, 30 and 32, respectively, connected to the corresponding motor input terminals 34, 36 and 38. A neutral conductor 40 is connected to the center tap of star connected stator winding 26.

Stator 24 surrounds rotor 42 having rotor conductors 44 circumferentially spaced in a laminated iron core. The rotor output shaft 46 is connected to the load 48 of motor 22.

When energized, motor 22 exhibits a small amount of impedance in series with each of the input terminals 34, 36 and 38. This impedance comprises, in the main, the leakage reactance of the motor and is small when compared to the rated impedance of the motor.

Current source power supply 20 is shown in simplified form in FIG. 1 to facilitate an understanding thereof. The supply is shown as energized by alternating current, typically, power mains 50 connected to alternating current source 52. The alternating current source includes center tap conductor 54. Power mains 50 are connected to power source 56 of power supply 20. Power source 56 may include a full wave rectifier 58 having the anodes of thyristors 60 and 62 connected to power mains 50. The cathodes of the controlled rectifiers are connected to output terminal 66 and conductor 64. The direct current output of source 56 appears at output terminal 66 and at output terminal 68 located between conductor 54 and conductor 40. The arrow identified by the number 21 in FIG. 1 indicates the output current of power source 56 and its direction of flow out of output terminal 66 and into output terminal 68.

The magnitude of direct current 21 provided by power source 56 is controlled by firing circuit 70 which supplies signals to the gate terminals of the thyristors. Firing circuit 70 may be any firing circuit suitable for providing firing signals to the thyristors at desired firing angles, responsive to a signal from a control device, such as potentiometer 72, and to the various feedback signals applied to the firing circuit, as hereinafter described. For example, firing circuit 70 may be a biased sine wave, phase shift firing circuit such as is shown on page 434 of J. Millman and S. Seely, *Electronics*, (1941).

The power source 56 must function as a current source, that is, a source, the output current of which does not vary with the output voltage. To accomplish this, it is necessary to provide current regulation to the source and to insert an inductor in the output thereof to assist in maintaining current 21 at the desired level.

A simplified current regulation circuit is exemplarily shown in connection with source 56 in FIG. 1 including an output current sensing means, such as resistor 74 in conductor 64, which provides a feedback signal corresponding to the actual output current 21 of source 56 in conductor 76. The signal in conductor 76 is compared with the signal corresponding to desired current from potentiometer 72 at summing junction 78 and a current error signal provide in conductor 79 to firing circuit 70. The regulation provided by the aforementioned feedback signal and circuitry causes the actual output current of source 56 to approach the desired current, as selected by potentiometer 72.

An inductor or choke 80 is interposed in conductor 64 to prevent any rapid changes in the magnitude of direct current 21 supplied by power source 56. Inductor 80 serves to absorb short duration voltage transients and smooth out the ripple current produced in the power supply and further, provides the necessary integration function essential to the stability of the current regulator. The size of inductor 80 may be commensurate with the speed of regulating action of the current regulator.

Current regulated power source 56 and inductor 80 form a current source which provides current 21 of a desired magnitude to the remaining portion of the power supply. In order to maintain a current source characteristic of power supply 20, it is essential that no substantial energy storage means of the constant voltage type, for example, capacitors, be placed across conductors 64 and 40, either in the inverter portions of the power supply or elsewhere, as such elements would compromise the current nature of the power supply.

Inverter 82 is connected to conductor 65 in series with inductor 80 and the terminals 34, 36 and 38 of motor 22 to cyclically direct current 21 into stator coils 26A, 26B and 26C so as to provide the rotating magnetic field in motor 22 necessary to revolve motor output shaft 44. In the simplified motor control 20 shown in FIG. 1, the current 21 flows into each of stator coils 26A, 26B and 26C from the respective input terminals 34, 36 and 38 and flows out of the winding into conductor 40 for return to terminal 68 of power source 56.

Inverter 82 comprises three parallel current paths 84, 86 and 88 extending between conductor 64 and output conductors 28, 30 and 32. Thyristor 90 and diode 92 are connected in series in current path 84. Thyristor 94 and diode 96 are connected in series in current path 86 and thyristor 98 and diode 100 are connected in series in current path 88.

A commutating capacitor is connected across each pair of current paths to effect turn off of the thyristors 90, 94 and 98. Capacitor 102 is connected across current paths 84 and 86, capacitor 104 is connected across current paths 86 and 88, and capacitor 106 is connected across current paths 84 and 88. To assist in the start up of inverter 82, a precharge circuit 108 is connected to the capacitors and by conductor 109 to conductor 65.

Thyristors 90, 94 and 98 are fired, or rendered conductive, by a firing means which may typically consist of ring counter 110 and oscillator 112. Oscillator 112, which may be of the relaxation type, generates a series of firing pulses to ring counter 110. The frequency of generation of these pulses is determined by a control, shown diagramatically as potentiometer 114. Ring counter 110 distributes these firing pulses to thyristors 90, 94 and 98 in the desired sequence. The desired sequence may be as above, or it may be the reverse, i.e., thyristors 98, 94 and 90. The sequence in which the thyristors are fired determines the sequence energization of the stator coils of motor 22 and the direction of rotation of the rotating magnetic field of stator winding 26 of motor 22. The rate at which firing pulses are generated by oscillator 112 determines the speed of rotation of the stator magnetic field. Ring counter 110 may be of the type shown on page 4–4 of *Application Memos*, published by the Signetics Corp., Sunnyvale, Calif. (1968).

Inverter 82 which may be described as a diode isolated capacitor commutated inverter, effects commutation by current transfer, that is, by transferring current out of one of the parallel current paths into another current path.

In operation, potentiometer 72 is adjustable to provide current 21 of a desired magnitude at output terminals 66 and 68 of power source 56. Inverter 82 causes a periodic and sequential application of this current to stator coils 26A, 26B and 26C in the form of square wave current pulses. The current pulses generate a rotating stator magnetic field in motor 22. The interaction of the stator field with rotor conductors 44 causes rotor 42 to rotate in accordance with the rotation of the stator magnetic field and at a speed proportional to the frequency of application of the stator current pulses, as selected by manipulation of potentiometer 114.

Consider now the manner in which inverter 82 causes the periodic and sequential application of current 21 to the coils of stator winding 26 as disclosed in the referenced application. The operation of the improved inverter is discussed below. It may be assumed that thyristor 90 is in the conductive state and is supplying current 21 from output terminal 66 of power source 56 through diode 92 to conductor 28 and stator coil 26A. It may also be assumed that capacitor 106 and capacitor 102 have been charged such that a positive potential exists on the common connection of the cathode of thyristor 90 the upper plates of capacitors 106 and 102 and the anode of diode 92.

When current 21 has flowed through stator coils 26A for a time period commensurate with the frequency of energization of stator winding 26, thyristor 94 is gated. When thyristor 94 is gated, the current in thyristor 90 is extinguished by the voltage on capacitors 106 and 102. Thyristor 90 is thus commutated off by capacitors 106 and 102. The current 21 from power source 56 then flows through thyristor 94 but remains momentarily unchanged through diode 92, capacitors 102, 104, 106 and stator coil 26A. Current flow through capacitor 102 from thyristor 94 to diode 92, discharges capacitor 102, causing its voltage to go through zero and to build up in the opposite polarity. As the voltage on capacitor 102 becomes equal to the voltage between conductors 28 and 30, diode 96 becomes unblocked and the voltage on capacitor 102 is applied to stator coils 26A and 26B. This initiates current flow in conductor 30 and stator coil 26B and commences the transfer of current from stator coil 26A to 26B. The transfer of current from stator coil 26A to 26B of motor 22 proceeds at an increasing rate as the voltage on capacitor 102 continues to build up due to the stator coil 26A current still flowing through it. Finally, the complete current 21 from power source 56 is transferred or commutated into stator coil 26B, leaving capacitor 102 charged with a very substantial negative potential at the upper plate and a corresponding positive potential at the lower plate, due to the leakage reactance of the motor 22.

During the above described commutation, at the same time current is flowing through capacitor 102, current is also flowing serially through capacitor 104 and and capacitor 106 so that at the completion of the commutation, capacitor 104 has been charged with its upper plate positive and its lower plate negative. This charge and the charges on capacitors 102 and 106 are retained on the capacitors by the blocking, or isolating, action of the associated diodes.

When thyristor 98 is fired to continue the cyclical application of current 21 to stator winding 26, capacitors 102 and 104 effect the turn off of thyristor 94 and the commutation of current from stator coil 26B to 26C in a manner similar to that described above. When thyristor 90 is fired capacitors 104 and 106 effect the turn off of thyristor 98 and the commutation of current 21 from stator coil 26C to 26A.

While the thyristors in power supply 20 have been shown as silicon controlled rectifiers in FIG. 1, it will be appreciated that other devices such as gas filled tubes may be used.

The repetitive and sequential application of current 21 to the coils of stator winding 26 by inverter 82 is continued during the motoring operation of motor 22 to drive load 48. The speed of motor 22 and load 48 may be altered by altering the frequency of application of the current pulses, as by manipulation of potentiometer 114.

The magnitude of the output current 21 of power source 56 is maintained at the desired level regardless of load and speed changes in motor 22, and the resulting voltage changes in power supply 20, by the action of the current regulating circuitry of power source 56. This circuitry advances or retards the firing angles of the thyristors in rectifier 58 so as to provide the output voltage from power source 56 necessary to maintain current 21 at the desired level. The magnitude of current 21 may be altered by manipulation of potentiometer 72.

Power supply 20 is inherently capable of regenrative operation. Regenrative operation facilitates maintaining control over the speed of motor 22 under conditions in which load 48 is driving motor 22 faster than inverter 82. Such a condition is commonly called operation with an overhauling load and results in a reversal of the voltage between conductors 65 and 40 so that the motor becomes a source of electrical power, rather than a load. The direction of current flow through power supply 20 remains the same.

As in motoring operation, the current regulating circuitry of power source 56 operates to automatically maintain current 21 of power supply 20 at the desired level, regardless of the terminal voltage inverter 82 and will provide from power source 56, a voltage of the magnitude and polarity necessary to so maintain the current. Under conditions in which the voltage at the terminals of motor 22 has reversed, the current regulating circuitry of power source 56 will cause the voltage of the power source to reverse so that the power source becomes an electrical load for motor 22 as a source. This effects regenerative operation.

A series circuit comprising an inductor (reactor) and a diode is connected in parallel with each thyristor with the diode being connected to carry current in a direction opposite to that of the thyristor. Each series circuit comprising a diode and reactor is connected between a first point in each of the current paths intermediate between the thyristor and the isolating diode. The other end of each series circuit is connected to the input of the invertor circuit, i.e., to the output of inductor 80 in FIG. 1. Diode 120 and reactor 122 are connected in series between a point intermediate thyristor 90 and diode 92 and, at the other end, conductor 65. Diode 124 and reactor 126 are connected at a point intermediate thyristor 94 and diode 96 in a second current path and, at the other end, conductor 65. Diode 128 and reactor 130 are connected in series between a point intermediate thyristor 98 and diode 100 in a third parallel path, and at the other end, conductor 65. Of course, the positions of the diode and the reactor in the series circuit could be reversed.

Turning now to the operation of the improved inverter 82 of the invention, continue the assumption that the circuit operation is observed at a time to, when the current is flowing from conductor 65 through thyristor 90 and diode 92 into motor terminal 34. In this case the voltage on capacitor 102 will be positive at the top terminal and negative at the bottom terminal. At time $t_1$ thyristor 94 is fired. The voltage on capacitor 102 is thereby applied to thyristor 90. Thyristor 90 ceases to conduct thereby causing current to flow through thyristor 94 and capacitor 102. The voltage on capacitor 102 is also applied to reactor 122 through diode 120 and thyristor 94. This voltage causes current to build up in reactor 122 in manner normally described as a resonant discharge or "ringing." Reactor 122 resonantly discharges capacitor 102 in a time determined by their respective L-C values. At the end of the first half cycle of ringing, the current attempts to reverse in the reactor but is blocked by diode 120. Also, as the voltage on capacitor 102 builds up in the negative polarity, diode 96 is unblocked. The voltage on capacitor 102 is thus applied to motor terminal 36 and causes the motor current to be commutated out of terminal 34 and into terminal 36.

This sequence is repeated through other like components in response to the firing of thyristor 98, then thyristor 90 to complete one cycle of operation.

I claim:

1. An inverter interposable between a source of electric energy and the terminals of an alternating current device for effecting current energization of the periodic type in the device to control the operative condition thereof, such a device having a reactance which is sufficiently small as to permit alteration of the current in a time interval which is short compared to the period of the current, the electrical energy source providing a unidirectional output current of substantially a desired magnitude, said inverter comprising:
   a. an input connectable to said electrical energy source and an output connectable to the terminals of said alternating current device;
   b. at least a pair of parallel current paths between the input and output of the inverter, each of said current paths containing a thyristor and a diode connected in series therewith;
   c. a control means coupled to the thyristor for cyclically placing the thyristor in the current conductive state for providing current energization of a periodic type in said device; a capacitor connected across said current paths between a first point in each said current path intermediate the thyristor and the diode of each pair for transferring current between said paths and for placing said thyristors in a non-conductive state; and
   d. a reactor and a diode means connected in series between said first point in each said current path and said input of said inverter, said reactor resonantly discharging a corresponding said capacitor connected between a pair of current paths thereby minimizing the time required to transfer current between paths.

2. The inverter as claimed in claim 1 wherein said diode means has a polarity to conduct with reverse voltage applied to the thyristor in said corresponding current path.

3. The inverter as claimed in claim 2 wherein said diode means conducts for less than half of the conduction period of one thyristor.

4. The inverter as claimed in claim 1 wherein current begins to flow through said reactor at substantially the same time whenever current begins to flow through a thyristor in another of said current paths.

5. The inverter as claimed in claim 4 wherein the period of current flow through reactor is determined by the L-C time constant of said reactor and said corresponding capacitor.

6. The inverter as claimed in claim 5 wherein current flowing through said reactor also flows through a thyristor in another of said current paths thereby discharging said corresponding capacitor in a minimum amount of time.

7. A power supply interposable between a source of electric energy and the terminals of an alternating current device for effecting current energization of a periodic type to control the operative condition thereof, said device having a reactance which is sufficiently small as to permit alteration of the current in a time interval which is short compared to the period of the current, said power supply comprising:
   a. a power source having an input connectable to the electrical energy source, said power source providing a unidirectional output current of substantially a desired magnitude at the output thereof;
   b. an inductor connected to the output of said power source for maintaining the output current at the desired magnitude, said inductor forming, with said power source a unidirectional current source; and
   c. an invertor having an input connected to said current source and an output connectable to the terminals of said current device, at least a pair of parallel current paths between the input and output of the invertor, each of said current paths containing a thyristor and a diode connected in series therewith, a control means coupled to the thyristor for cyclically placing said thyristor in a current conductive state for providing current energization of the periodic type in said device, a capacitor connected across said current paths between a first point in each said current path intermediate said thyristor and said diode of each pair for transferring current between said paths and for placing said thyristors in a non-conductive state, and a reactor and a diode means connected in series between said first point in each said current path and said input of said inverter, said reactor resonantly discharging a corresponding capacitor thereby minimizing the time required by said corresponding capacitor to transfer current between said paths.

* * * * *